Aug. 4, 1925.

W. T. MIXSELL

TIRE BUILDING MACHINE

Filed Oct. 22, 1923

1,548,156

WARD T. MIXSELL
INVENTOR.

BY
ATTORNEY.

Patented Aug. 4, 1925.

1,548,156

UNITED STATES PATENT OFFICE.

WARD T. MIXSELL, OF CUMBERLAND, MARYLAND, ASSIGNOR TO KELLY-SPRINGFIELD TIRE COMPANY, OF CUMBERLAND, MARYLAND, A CORPORATION OF NEW JERSEY.

TIRE-BUILDING MACHINE.

Application filed October 22, 1923. Serial No. 670,036.

*To all whom it may concern:*

Be it known that I, WARD T. MIXSELL, a citizen of the United States, residing at Cumberland, in the county of Allegany and State of Maryland, have invented certain new and useful Improvements in a Tire-Building Machine, of which the following is a specification.

This invention relates to the formation of solid rubber tires, such for instance, as those made by winding ribbon-like strips of unvulcanized rubber onto a metallic base ring direct from the calender machine.

Specifically, the improvements herein recited pertain to the trimming of the ribbon-like strips of gum whereby they shall ultimately be wound upon the base rim in gradually diminishing widths, forming tapering sides to the finished structure without necessitating a secondary final trim-off.

The usual and well known process of forming these tires comprises merely the laying up of various laminæ of gum strips on the rim, either in parallel strips whereby the cross section of the finished tire is substantially rectangular and must thereafter be laboriously taper-trimmed to a trapezoidal form, or, in some semblance of tapered form attained by tapping the knife elements that sever the gum from the calender rolls at intervals toward each other whereby a crude approximation of the ultimate trapezoidal cross sectional outline is attained. These methods are expensive in the loss of trimmed gum involved, and are generally unsatisfactory.

A more scientific method of automatically taper-trimming the unapplied gum strips to accomplish the desired purpose is disclosed in United States Letters Patent No. 1,312,491 of August 5, 1919, wherein the strips are trimmed in gradually diminishing widths under the convergent action of cam-controlled knives which are actuated by a sliding cam, in turn operated by a follower roller in direct contact with the outer or last layer of gum strip applied on the rotating base ring. This excellent patented device has several features upon which improvement has been made by the herein set forth disclosure.

Being cognizant of what has been done in the past and of the inherent defects of prior devices, my invention comprises specific means for automatically taper-trimming and centering the trimmed stock with respect to the rotating rim upon which it is to become associated; as fully explained in the accompanying disclosure.

One of the objects attained is the positioning of the cam mechanism whereby it cooperates with the outside dimensions of the rim members in a manner to automatically aline the gum strip with the median plane of rotation of the rim, thus insuring that the strips will assemble symmetrically on the face of the rim.

Another object is to cause the cutting knives to be automatically operated by a cam-control operably associated with the increment of gum upon the rotating rim but without having any part of the cam mechanism in contact with the face of the soft gum on the face of the rim.

With these and other objects in view, the invention further comprises the novel elements and combinations more specifically hereinafter disclosed.

Figure 2:
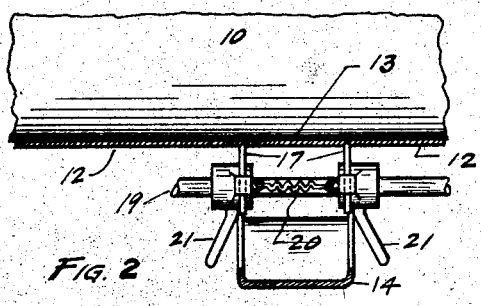
Fig. 2 is a partial view through 2—2 of Fig. 1, showing the rim and cam gear at the starting position.

In view of the simplicity of the entire mechanism, only a brief description will be given to disclose the principal features to those skilled in the art.

The hot rolls of the sheeting calender are generally indicated as 10, with a batch of rubber 11 feeding in as shown. The sheeted stock 12 issues from the operating face and that part of the trimmed-off stock to be wound upon the rim as 13. Such portion of the stock 12 that is not utilized on the rim is caused to lead over a freeing roller along the face and parallel with the calender rolls 10.

The metallic edge-flanged rim 14 is mounted on a fulcrumed roller cradle 15, whereby the rim is caused to tilt by gravity toward the calender. Interposed between the lower calender roll 10 and the rim 14 is an idler 15 suitably journaled parallel to the former. This idler is caused to rotate by frictional contact with roll 10, and, in turn transmits rotary movement to the rim 14, likewise by frictional contact.

The strip 13 being fed onto the rough face of the rim 14 and pressure-rolled thereon by the idler 15, will continue to wind itself up at the expense of backing the rim away from the idler by tilting the frame 15 about its fulcrum 16.

The stock strip 13 is severed by a pair of independent knives 17 suitably retained in an elongated laterally slidable journal 18 mounted for free movement longitudinally of a guide rod 19. The knives and journals are caused to converge by the action of a tension spring 20, except as restrained by the cam arms.

Each knife journal 18 is fitted with a cam arm 21, the rearward extension of which contacts with and slides along the outer edge of the flanged portion of rim 14.

Figure 3:
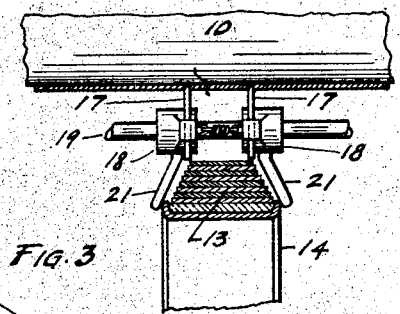
Fig. 3, shows a view in the same plane as that of Fig. 2, but at the end of the winding process with the cams and knives converged to their ultimate limits.
Figure 1:
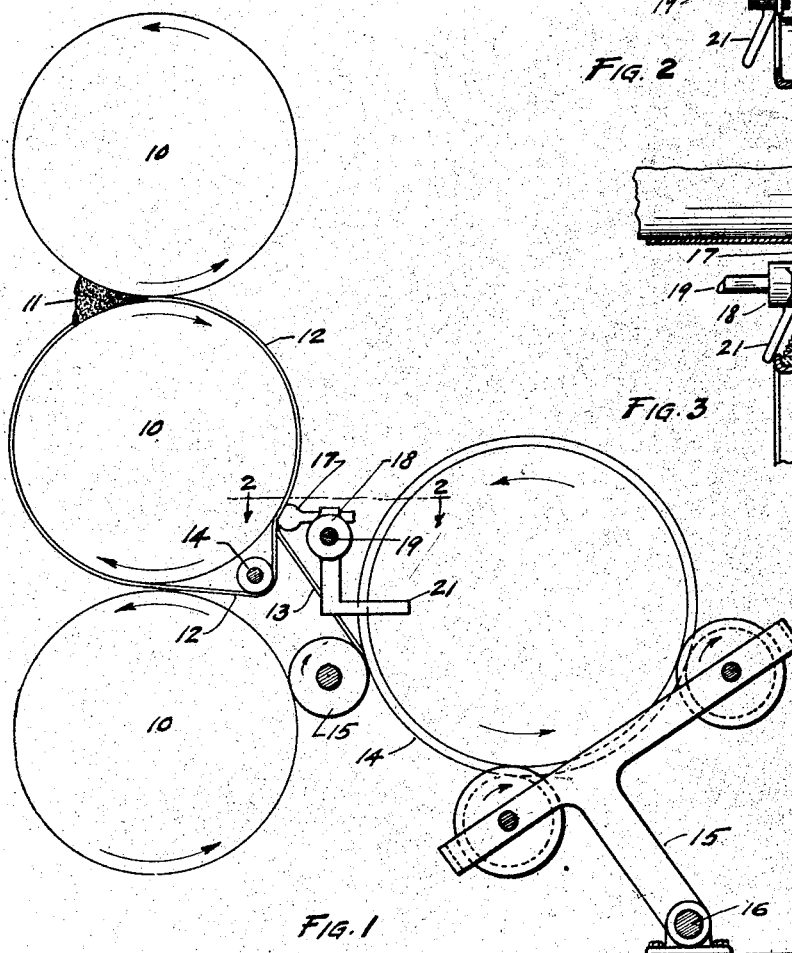
Fig. 1 is a more or less diagrammatic side view of the device in association with a conventional calender machine. The metallic rim on which the tire is formed is shown at the start of the winding operation and before the cam control of the sheeted strip is active.

The purpose of these cam arms are made apparent by inspection of Figures 2 and 3. In Fig. 2, which represents the start of operations, the cam is spread to its limit and the associated knives are about to make their widest stage of the cutting. In Fig. 3, which represents the completion of the building of the tire structure to its designed depth, the cam is contracted to its limit under the impulse of the tension spring 20.

It will be readily appreciated that the rim 14 will gradually back itself away from the roller 15 as the winding on of stock progresses. Now the cam system is in fixed relation with the calender machine, and its axis does not shift with the recession of the rim; it is therefore obvious that the converging arms 21 of the cam must begin to approach each other as the building operation proceeds. The convergence of the cam arms gradually brings the knives 17 together in a manner to taper-trim the strip of stock 13 and to cause it to assemble in the form indicated in Fig. 3.

In the building of these tires, great difficulty is experienced in causing the rim members to rotate in an established plane. Where previous cam-controlled knife systems for trimming the assembled strip have been resorted to, it has been found that the cam, not being centered by the edges of the rim, would not operate to compensate for the "weaving" or eccentricity of the rotating plane of the rim, thus causing the strips to become unevenly applied. The present arrangement removes this defect and at the same time removes the operating element of the cam system from the face of the soft "tacky" gum on the rim, thus making for greater uniformity in the result and, at the same time avoiding the "scuffing" up and injury to the face of the last strip laid.

Having now described an effective and simple device for improving upon the method of accomplishing the given operation, and reserving to myself the wide range of equivalency that may reside in substitute elements for accomplishing the work, what I claim is:

1. In a device of the character described, the combination with a rubber sheeting machine and a rotating rim member adapted to receive sheeted strips therefrom, of a plurality of cam-controlled strip severing knives adapted to sever stock from the sheeting machine, means for progressively converging the knives in related degree to the increment of sheeted stock upon the rim, said means being in contact with the sides of the rim in constant symmetrical relation to the median plane thereof.

2. In a device of the character described, the combination with a rubber sheeting machine and a rotating rim member adapted to receive sheeted strips therefrom, fulcrumed rim support members adapted to rotatably associate the rim with a moving part of the sheeting machine whereby the rim may automatically vary its rotating center toward and away from the sheeting machines as controlled by the increment of sheeted stock on the rim, knife elements for severing a strip of stock from the sheeting machine to be wound upon the rim, cam elements contacting with the outside edges of the rim whereby the knives are caused to cut a progressively narrowing strip from the sheeted stock, said cam and knives being so coordinated with respect to the rim member that the cutting path shall be constantly centered thereon.

3. In a device of the character described, the combination with a source of supply of sheeted stock and a rotatable rim member adapted to wind stock thereon from said supply, knife elements for severing sheeted stock, a plurality of independent laterally movable cam elements contacting with the opposite flanges on the rim member, said cams and knives cooperating to sever a gradually tapered strip of stock in centered relation to said rim as the stock is accumulated thereon.

4. In a device of the character described, the combination with a rubber sheeting machine and a rotating rim member adapted to receive sheeted strips therefrom, strip trimming elements actuated by cam means in operative contact with a portion of said rim, means for effecting a relative shifting between the rim and the said cam means as stock is accumulated on the face of the rim whereby the trimming elements are caused to trim said stock to a predetermined variable width.

In testimony whereof I affix my signature.

WARD T. MIXSELL.